No. 887,724. PATENTED MAY 12, 1908.
I. R. HUTCHINSON & B. HUNT.
FRUIT SEEDING MACHINE.
APPLICATION FILED JUNE 17, 1907.
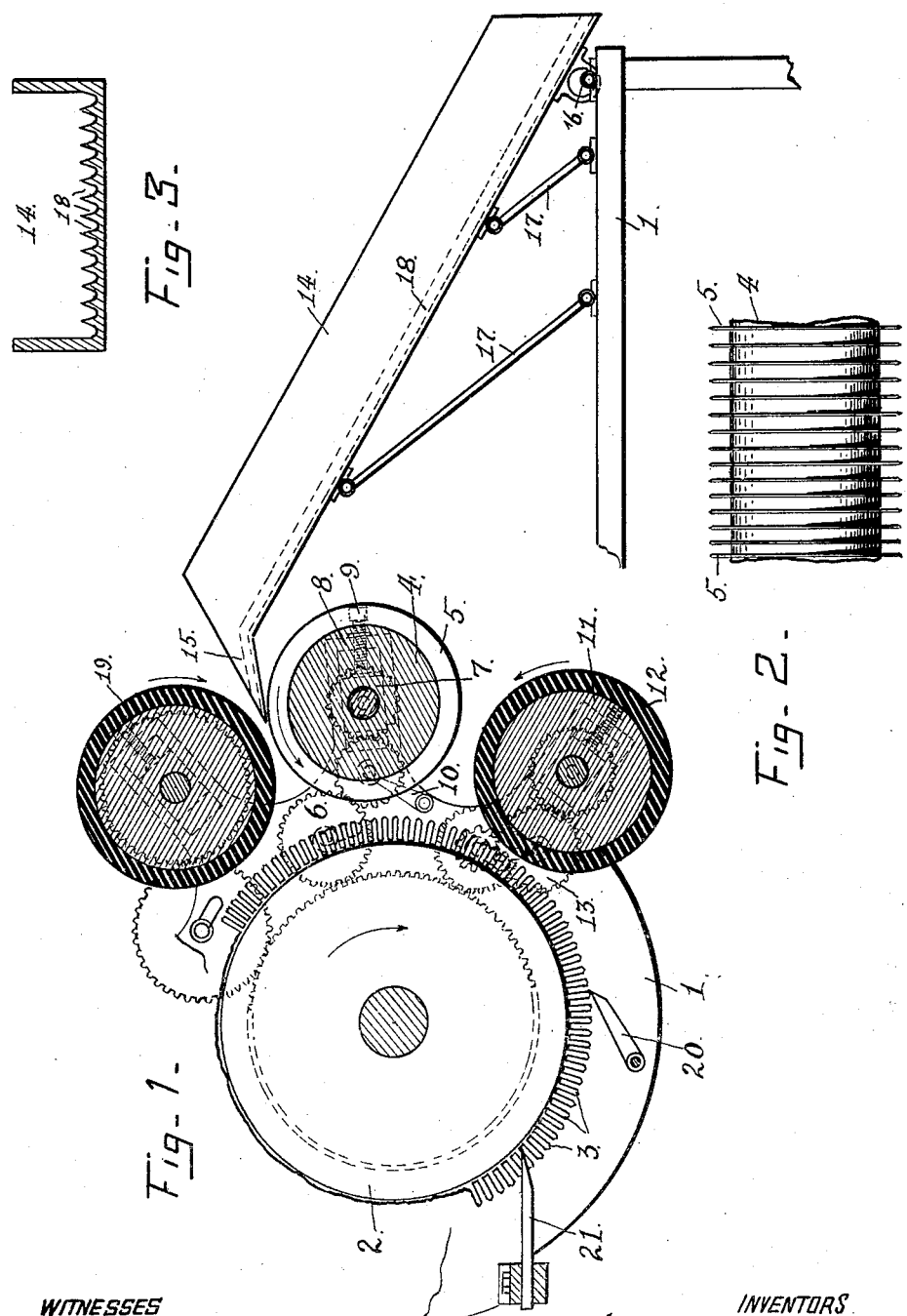
WITNESSES
INVENTORS
Ira R. Hutchinson
Ben Hunt
BY Wm F. Booth
ATTORNEY

UNITED STATES PATENT OFFICE.

IRA R. HUTCHINSON AND BEN HUNT, OF FRESNO, CALIFORNIA; SAID HUNT ASSIGNOR TO UNITED STATES CONSOLIDATED SEEDED RAISIN COMPANY, OF NEW YORK, N. Y., A CORPORATION OF NEW YORK.

FRUIT-SEEDING MACHINE.

No. 887,724.        Specification of Letters Patent.        Patented May 12, 1908.

Application filed June 17, 1907. Serial No. 379,308.

To all whom it may concern:

Be it known that we, IRA R. HUTCHINSON and BEN HUNT, citizens of the United States, residing at Fresno, in the county of Fresno and State of California, have invented certain new and useful Improvements in Fruit-Seeding Machines, of which the following is a specification.

Our invention relates to that class of fruit-seeding machines in which the fruit is fed between a pair of rolls, one of which is adapted to receive the seed excluded by the pressure of the rolls. In machines of this class the seed-receiving roll has, usually, a yielding surface, and is commonly known as the pressure roll. It is usually covered with rubber or some elastic material or composition, while the opposing or main-roll, known also as the carrier roll, has a surface, usually consisting of pins or teeth set close enough together to prevent the seed from entering between them. In this way the meat of the fruit and its seeds are separated, the former being pressed upon the teeth, while the latter are forced out by the teeth from the meat, and are temporarily received and embedded in the yielding surfaced roll, thereby enabling them to pass between the rolls. This is the general construction of machines used for seeding raisins; and it is found with such fruit, that under the specialized, positively directed pressure of the teeth, the comparatively small seeds may be thus positively forced out through the relatively tender skin of the raisin, without having to preliminarily puncture or cut the skin on the side through which the seeds are forced. But, with other fruit, such, for instance, as prunes, the skin of which is quite tough, and the seed relatively large, this is not practicable without undue pressure, resulting in extensive laceration and injury. With such fruit, especially with prunes, we have found it necessary to cut or slit the skin on that side through which the seed is to be forced.

This is the object of our invention; and its attainment results in the provision of a machine which will effectively seed fruit, without special regard to the character of the surface of the main-roll, and is especially adapted for fruit with relatively large seeds and tough skins, such, for example, as prunes; though it may be applied to raisins also.

Our invention, therefore, consists, essentially, in the combination with the opposing seed-separating rolls of a fruit-seeding machine, of means, in advance of said rolls, for cutting the skin of the fruit on that side through which the seed is to be forced.

It also consists in the novel construction, arrangement and combinations which we shall, hereinafter, fully describe, by reference to the accompanying drawings in which Figure 1 is a cross-section of the machine, partly broken, the feeder being in side elevation. Fig. 2 is a broken front elevation of the slitting or cutting cylinder. Fig. 3 is a cross-section of the fruit feeder.

1 indicates a part of any suitable supporting frame, in which is mounted the main-roll 2 to which a rotary motion is given, in the direction of the arrow, by any suitable mechanism. This main-roll may be constructed in any suitable manner, and its surface may be formed in any suitable way. We have here shown it, following the analogy of the common raisin seeders, as having a series of teeth 3 projecting from its surface, which teeth are set close enough together to prevent the seeds from entering between them.

Opposing the main-roll 2, on one side, is the slitting or cutting cylinder 4, which may be suitably constructed. In the form we have shown, it is composed of a core, with encircling, spaced knives 5. This cutting cylinder rotates in the direction of the arrow, by any suitable means, as, for example, by the rotation of the main-roll acting through a suitable gear-train, indicated by 6; and said cylinder is mounted, as indicated in Fig. 1, in a box 7, which is adjustable in a bearing 8, by means of a screw 9, so that it may be set up to its proper place to suit the size of the fruit.

10 is one of a series of fingers which enter the spaces between the knives 5, and serve the purpose of removing the fruit from said knives.

Directly below the cutting cylinder 4, is the pressure roll 11, which is provided with a yielding or elastic surface, as is indicated by 12. This roll is also adjustably mounted as indicated in Fig. 1, so that it may be set up in proper relation to the main-roll 2; and it receives rotation by any suitable means, as, for example, from the main-roll through the intervention of the gear-train 13.

14 represents a fruit-feeder. It may be of any suitable character, and it is so disposed as to feed the fruit to the top of the cutting cylinder. It is here shown as an inclined trough, the spout 15 of which overlies the cutting cylinder, and the base of which is pivotally supported on frame 1, at which point there is a cam or eccentric device, indicated at 16, which will give the trough an eccentric swinging motion on its supporting links 17. These links, under the action of the cam 16, will give the feeder such a movement that the fruit, resting and traveling in the bottom grooves or ways 18, Fig. 3, of the trough, will travel up the incline and be discharged by the spout of the feeder with precision and without interference. The bottom grooves 18 of the feeder are proportioned in width to the fruit being operated on, and are disposed in line with the knives 5, so that the fruit will be carried up singly and will be delivered precisely to the knives.

Above the cutting cylinder is the roll 19, also adjustably mounted, and of a construction which may be similar to that of the pressure roll below. The roll 19 is so disposed relatively to the cutting cylinder that it opposes its pressure to said cylinder in such proximity thereto that it furnishes the necessary resistance to the fruit to enable the cutting knives to slit the skin, as the fruit passes between said roll and cylinder. This resistance, in addition to mere pressure, involves, in the best construction, a holding back on the fruit, attained by driving the cutting cylinder at a higher rate of speed, than that of the roll 19. This difference in rate is indicated by the gearing here shown, and the result is that the fruit is retarded by the slower revolving roll, thereby causing the faster revolving cutting cylinder to slit the skin of the fruit with a draw cut, so to speak, of a positive nature.

20 is a plate, the purpose of which is to scrape off the seeds which may cling to the main roll.

21 is a comb which removes the fruit from the main roll.

The operation of the machine is as follows:—
The fruit is supplied to the feeder 14, and in its bottom grooves it travels upwardly and is delivered to the top of the cutting cylinder. As it passes between the cylinder and the opposing pressure roll 19, its skin is slit; and then it is removed from the knives of the cylinder by the fingers 10, and passes down between the pair of seeding-rolls 2 and 11, by which the seeds are separated in the usual manner, that is, by being forced outwardly into the yielding surface of the roll 11. The seed, with the present machine, can be thus forced outwardly easily, because of the slitted skin of the fruit. The meat of the fruit will cling to the main-roll, and, in case said roll has teeth, as here shown, the meat will be impaled or forced inwardly upon said teeth. The separation of the seed and meat is thus effected. The seeds either drop off when they pass the pressure roll, or if they cling to the teeth of the main-roll, they will be scraped off by the plate 20. The meat is removed from the main-roll by the comb fingers 21.

Having thus described our invention, what we claim as new and desire to secure by Letters Patent is,

1. In a fruit-seeding machine, the combination of opposing seed-separating rolls, and means, in advance of said rolls, for cutting the skin of the fruit on that side through which the seed is to be forced.

2. In a fruit-seeding machine, the combination of a main-roll for forcing the seeds out; an opposing roll to receive the excluded seeds; and a means, in advance of said rolls, for cutting the skin of the fruit on its side next to the opposing roll.

3. In a fruit-seeding machine, the combination of opposing seed-separating rolls, and means, in advance of said rolls, for cutting the skin of the fruit on that side through which the seed is to be forced, consisting of a cutting device and an opposing pressure device.

4. In a fruit-seeding machine, the combination of opposing seed-separating rolls, and means, in advance of said rolls, for cutting the skin of the fruit on that side through which the seeds are to be forced, consisting of a revolving cutting cylinder and an opposing revolving pressure roll.

5. In a fruit-seeding machine, the combination of opposing seed-separating rolls, and a revoluble cutting cylinder in advance of said rolls, for slitting the skin of the fruit on that side through which the seeds are to be forced.

6. In a fruit-seeding machine, the combination of opposing seed-separating rolls; means, in advance of said rolls, for cutting the skin of the fruit on the side through which the seeds are to be forced, consisting of a revolving cutting cylinder and an opposing revolving pressure roll; and means for rotating the cutting cylinder at a higher rate of speed than that of the opposing pressure roll.

7. In a fruit-seeding machine, the combination of opposing seed-separating rolls; a cutting device preceding said rolls, to cut the skin of the fruit on the side through which the seeds are to be forced; and means for feeding the fruit to said cutting device.

8. In a fruit-seeding machine, the combination of opposing seed-separating rolls; a revoluble cutting cylinder, in advance of said rolls, having a series of spaced, annular knives, to slit the skin of the fruit on the side through which the seeds are to be forced; and a feeder for the fruit, having a series of parallel, spaced ways to feed the fruit to the knives of the cutting cylinder.

9. In a fruit-seeding machine, the combination of opposing seed-separating rolls; a revoluble cutting cylinder, in advance of said rolls, to slit the skin of the fruit on the side through which the seeds are to be forced; a revoluble pressure roll opposing the cutting cylinder; and means for feeding the fruit between the cutting cylinder and the opposing pressure roll.

10. In a fruit-seeding machine, the combination of opposing seed-separating rolls; a revoluble cutting cylinder, in advance of said rolls, having a series of spaced annular knives, to slit the skin of the fruit on the side through which the seeds are to be forced; a revoluble pressure roll opposing the cutting cylinder; and a feeder having a series of parallel, spaced ways to feed the fruit to the knives of the cutting cylinder.

In testimony whereof we have signed our names to this specification in the presence of two subscribing witnesses.

IRA R. HUTCHINSON.
BEN HUNT.

Witnesses:
N. A. ACKER,
D. B. RICHARDS.